Figure 1:
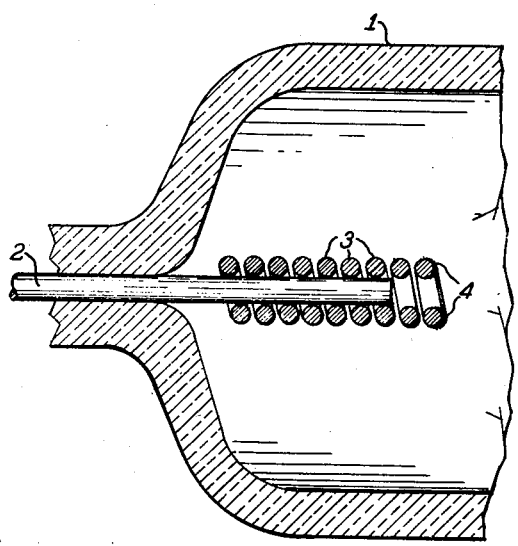

Feb. 14, 1950

H. GOOSKENS ET AL
ELECTRODE STRUCTURE FOR ELECTRIC
DISCHARGE DEVICES OR LAMPS
Filed March 30, 1946

2,497,496

INVENTORS:
HENRICUS GOOSKENS,
WILLEM ELENBAAS,
ADRIAAN ABRAHAM PADMOS,
BY John H Henderson
THEIR ATTORNEY Patented Feb. 14, 1950

2,497,496

UNITED STATES PATENT OFFICE 2,497,496

ELECTRODE STRUCTURE FOR ELECTRIC DISCHARGE DEVICES OR LAMPS

Henricus Gooskens, Willem Elenbaas, and Adriaan Abraham Padmos, Eindhoven, Netherlands, assignors to General Electric Company, Schenectady, N. Y.

Application March 30, 1946, Serial No. 658,410
In the Netherlands January 15, 1943

Section 1, Public Law 690, August 8, 1946
Patent expires January 15, 1963

4 Claims. (Cl. 176—126)

The invention relates to gas- or vapour-filled electric discharge tubes, more particularly to the electrodes of such a tube, and to a method of manufacturing the same.

Cathodes for gas-discharge tubes generally belong to two types of which the one type is constituted by a core body having applied to it a layer consisting of one or more oxides, as the case may be, mixed with metal particles, whilst the other type consists of a sintered body composed of a mixture of metals and oxides which functions as a cathode either as such, that is to say after being pressed and sintered, or which can only be utilized as a cathode when, after being pressed and sintered, the body has been drawn out into a wire or strip.

More particularly when utilized in discharge tubes filled with gas or vapour at a high or very high pressure, both types of cathodes have the drawback that the oxides vaporize comparatively rapidly from the cathodes, which, on the one hand, greatly shortens the length of life of these tubes and, on the other hand, produces a deposit on the wall with the result that the light output of these tubes, when utilized for illumination purposes or as radiators, is greatly reduced.

It would be possible to suppress this vaporization and volatilization by the use of electrodes which consist exclusively of a metal of very high melting-point and low vapour pressure such, for example, as tungsten, molybdenum, tantalum and the like but these metals have a high work function so that the electrodes made therefrom have a very high ignition or arc-initiation voltage and the operating temperature acquires so high a value that here again the rapidity of vaporization is still great. According to the present invention, these disadvantages are avoided by utilizing an electrode whch is constituted by a core body of a material of high melting-point, for example tungsten, molybdenum or tantalum, which is coated with a thin layer which consists exclusively or almost exclusively of one or more metals whose melting-point and boiling-point exceed 1550° C. and 3000° C. respectively. The thickness of the layer must be taken in this case of the order of magnitude of 100 microns or less. As metals of which the layer applied to the core body may consist may be utilized, for example, titanium, zirconium, thorium, tantalum, molybdenum, iridium and platinum.

With these electrodes the use of oxide layers is consequently completely abandoned and use is made of metals which have high melting- and boiling-points. Such electrodes have an appreciably lower work function than the solid metals so that they are ignited at a lower voltage. However, the length of life and the light output of the tubes employing solid high melting-point and high boiling-point metals are not reduced due to vaporization whilst we obtain the additional advantage that these thin layers of metal are better reproducible than oxide layers.

The above-described electrodes are preferably utilized in gas- and vapour-filled discharge tubes of high and very high pressure, that is to say in tubes wherein the discharge is contracted and does not fill the whole of the cross-section of the tube. Thus, for example, satisfactory results have been obtained in high-pressure mercury lamps which were not cooled artificially and wherein the mercury pressure amounted to 10 atms. and also in water-cooled high-pressure mercury lamps, for example with a pressure of 75 atms.

Different combinations of metals are possible for electrode constructions built according to the invention. Thus, for example, use may be made of a core of tungsten or molybdenum to which is applied a thin layer of tantalum. It is also possible, however, to constitute the outer layer by a mixture of tantalum and thorium whilst, on the other hand, it is also possible to utilize tantalum for the core body to which is applied again another layer, for example of molybdenum and thorium or of zirconium or platinum.

The invention will be explained more fully with reference to a few examples wherein the manufacture of an electrode of a tube according to the invention is described, and to a drawing which represents one form of construction of such an electrode.

To a wire or rod of tungsten, tantalum or similar material is applied a metal powder which has been obtained in the following manner: a powder consisting of one or more metals with a grain size of from 1 to 50 $\mu$ is worked up, with the aid of a viscous nitrocellulose solution, into a paste. The solution is prepared by introducing 450 grms. of nitrocellulose into 10 litres of amylacetate. Prior to its use this solution is diluted once more with amylacetate in a proportion of 1:1. Subsequently the electrode to be coated is dipped in the paste in such manner that the thickness of the layer of the applied metal finally lies between a few and 100 $\mu$. After being applied the layer is caused by fusion to adhere to the substratum, for example by raising the coated electrode in a flame or arc during a very short time (about 1 second) to a temperature which exceeds the melting-point of one of the components, if use is made of a mixture and which exceeds the melting-point of the metal to be applied if use is made of a single metal powder, the flame or arc operating in both cases in a neutral atmosphere. The heating for this fusing together may also be obtained in any other manner, for example, by utilizing a tungsten strip furnace, in which event a strip, through which passes the electric current, is formed into a cylinder in the axis of which the electrode to be heated is placed. The heating may also be effected in an efficient manner by causing the electrode to be heated to function as an anode of a discharge in a neutral atmosphere.

The metal coating need not be applied to the core body in the form of a paste as has previously been described. It is also possible to coat the support electrolytically or to apply the material by vaporization or volatilization in an arc, in which event use is made of an anode of the material to be applied and of a cathode of the material to be coated.

When tungsten or tantalum is utilized for the support very favourable results are obtained with mercury lamps provided with the following coatings: a mixture of 90% thorium and 10% molybdenum, 100% zirconium, 100% thorium, 66% tungsten and 34% tantalum, 90% tantalum and 10% thorium. Moreover, it is possible in different cases to work with great advantage with a coating of platinum or tantalum.

Figure 2:
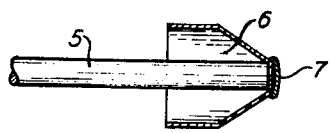

Fig. 1 of the accompanying drawing represents an electrode construction for a high-pressure mercury lamp which is not cooled artificially and which exhibits a pressure of approximately 10 atms. whilst Fig. 2 represents a construction of an electrode for a water-cooled high-pressure mercury lamp wherein the pressure amounts, for example, to 75 atms.

In Fig. 1, 1 denotes the wall of a tube, said wall consisting of quartz. Into this wall is sealed a lead-in conductor 2 of tungsten on which, in the interior of the tube, a tungsten coil 3 is wound. The length of the lead-in conductor portion on which the coil is wound is approximately 3 mms. whilst the coil protrudes from the said member over a length of 1 mm. A metal coating 4 according to the present invention is provided on the outside of the outermost turn. The various dimensions and other data of the above-described tube are as follows: internal diameter of the tube 8 mms., distance between the electrodes 25 mms., current 0.75 a., gas pressure 2.5 cms. of argon, operating voltage 115 v. and ignition voltage 180 v. With the use of a solid tungsten electrode the ignition voltage would be more than 500 v.

In Fig. 2, 5 denotes a leading-through member of tungsten which has a thickness of 0.5 mm. and on which is provided a conically ground block 6 also of tungsten. At the end of this block there is a coating 7, which consists, in accordance with the present invention, of one or more metals of high melting-point, viz. a melting point higher than 1550° C. The various data of this tube are as follows: internal diameter of the tube 2 mms., distance between the electrodes 30 mms., current 2 a., gas pressure 5 cms. of argon, operating voltage 500 to 1000 v.

What we claim as new and desire to secure by Letters Patent of the United States is:

1. An electrode structure for high pressure mercury vapor lamps and comprising a lead-in conductor and an over-wound coil constructed of a metal from the group of tungsten and molybdenum, said coil extending beyond the end of the conductor providing a recess and having its end-turn coated with a thin surface layer consisting essentially of a mixture of metallic tantalum and thorium.

2. The method of making a refractory electrode for high pressure mercury vapor devices which comprises admixing pulverulent metals of the group consisting of tantalum and thorium, forming a paste thereof by the addition of a binder including nitrocellulose and amylacetate, applying the paste to a main metallic body of metal of the group consisting of tungsten and molybdenum, and heating the composite electrode structure to the temperature at which thorium melts.

3. An electrode structure for high pressure mercury vapor discharge devices and comprising a main body constructed of a metal from the group consisting of tungsten and molybdenum and having thereon a thin metallic surface layer consisting of 90 per cent tantalum and 10 per cent thorium.

4. An electrode structure for high pressure mercury vapor lamps and comprising a lead-in conductor and an over-wound coil constructed of a metal from the group of tungsten and tantalum, said coil extending beyond the end of the conductor providing a recess at its end and having thereon a thin metallic surface coating consisting of 90 per cent tantalum and 10 per cent thorium.

HENRICUS GOOSKENS.
WILLEM ELENBAAS.
ADRIAAN ABRAHAM PADMOS.

REFERENCES CITED

The following references are of record in the file of this patent:

UNITED STATES PATENTS

| Number | Name | Date |
|---|---|---|
| 1,190,412 | Hudson | July 11, 1916 |
| 1,732,326 | Cooper | Oct. 22, 1929 |
| 1,787,674 | Marden | Jan. 6, 1931 |
| 1,925,076 | Miller | Aug. 29, 1933 |
| 2,060,043 | Cox | Nov. 10, 1936 |
| 2,130,190 | Lederer | Sept. 13, 1938 |
| 2,130,204 | Taylor | Sept. 13, 1938 |
| 2,249,672 | Spanner | July 15, 1941 |
| 2,263,164 | Dailey | Nov. 18, 1941 |
| 2,342,806 | Hofmann | Feb. 29, 1944 |
| 2,363,531 | Johnson | Nov. 28, 1944 |
| 2,368,060 | Wooten | Jan. 23, 1945 |